United States Patent [19]

Razavi

[11] Patent Number: 4,498,037
[45] Date of Patent: Feb. 5, 1985

[54] VELOCITY SERVO CONTROLLER

[75] Inventor: Saeid M. Razavi, St. Paul, Minn.

[73] Assignee: Electro-Craft Corporation, Hopkins, Minn.

[21] Appl. No.: 534,801

[22] Filed: Sep. 22, 1983

[51] Int. Cl.³ .............................................. G05B 13/00
[52] U.S. Cl. .................................. 318/561; 318/615; 318/616; 318/617; 318/632; 364/148
[58] Field of Search ............................. 318/615–618, 318/632, 561; 364/148

[56] References Cited

U.S. PATENT DOCUMENTS

| | | | |
|---|---|---|---|
| 3,648,031 | 3/1972 | Neal | 318/616 X |
| 4,337,427 | 6/1982 | Maudal | 318/615 |
| 4,439,716 | 3/1984 | Minnich | 318/632 |
| 4,446,409 | 5/1984 | Rawicz | 318/632 |
| 4,451,769 | 5/1984 | Minnich | 318/632 |

*Primary Examiner*—B. Dobeck
*Attorney, Agent, or Firm*—Kinney & Lange

[57] ABSTRACT

A motor compensation network for use with a two-degree of freedom velocity servo controller includes first and second compensation means. The first compensation means receives a signal representing a difference between a velocity command signal and a velocity feedback signal and provides a modified output signal. The second compensation means receives the velocity feedback signal and provides a modified output signal. Bandwidth adjustment means are coupled to the first and second compensation means. Damping factor adjustment means are coupled to the second compensation means. The transfer function of the first compensation means has characteristics of an integrator. The transfer function of the second compensation means has a first and a second component. The first component has characteristics of a differentiator, while the second component has characteristics of a proportionality or a gain constant. The bandwidth adjustment means varies the gain or scale factor of the integrator of the first compensation means and the gain or scale factor of the differentiator of the second compensation means according to a predetermined relationship. The damping factor adjustment means varies the gain of the proportionality constant of the second compensation means. The gain of the differentiator is maintained equal to a reciprocal of the gain of the integrator as bandwidth is adjusted, thereby keeping the bandwidth adjustment and damping factor adjustments independent from one another.

13 Claims, 4 Drawing Figures

Eq. 1. $G_v(S) = K_{T_1}/S$

Eq. 2. $G_f(S) = K(1+tS)$

Eq. 3. $t = \dfrac{1}{KK_I}$

Eq. 4. $\dfrac{W(S)}{VCS(S)} = \dfrac{K_T K_a K_I}{(LJ)S^3 + (L + KJ + K_a K_i J + K_T K_a K_V/K_I)S^2 + (K_a K_i + K_B + K_T K_a K_V K R)S + K_T K_a K_V K_i}$ Eq. 5. $\dfrac{W(S)}{VCS(S)} = \left(\dfrac{K_T K_I}{K_i J + K_T K_V/K_I}\right)\left(\dfrac{\dfrac{K_i + K_T K_V K}{K_i J + K_T K_V/K_I}}{S^2 + \dfrac{K_T K_V K_I}{K_i J + K_T K_V/K_I} S + \dfrac{K_T K_V K_I}{K_i J + K_T K_V/K_I}} + S^2\right)$ Eq. 6. $W_n = \left(\dfrac{K_T K_V K_I}{K_i K_i J + K_T K_V}\right)^{1/2}$ Eq. 7. $2dW_h = \dfrac{K_i + K_T K_V K}{K_i J + K_T K_V/K_I}$ Eq. 8. $d = \dfrac{\dfrac{K_i + K_T K_V K_0 K}{K_i J + K_T K_V/K_I}}{2\left(\dfrac{K_T K_V K_I}{K_I K_i J + K_T K_V}\right)^{1/2}}$ Eq. 9. $K_i \ll K_T K_V K$ Eq. 10. $K_i J \ll K_T K_V/K_I$ Eq. 11. $W_h \approx K_I$ Eq. 12. $d \approx \dfrac{K}{2}$ Eq. 13. $G_f(S) = \dfrac{S}{K_I} + K$ Eq. 14. $K_I = \dfrac{1}{R_{30} C_E}$

Fig. 4

VELOCITY SERVO CONTROLLER

BACKGROUND OF THE INVENTION

1. Field of the Invention

The present invention relates generally to motor control systems. In particular, the invention is an improvement to a two-degree of freedom servo controller for use with a motor.

2. Description of the Prior Art

Closed-loop servo systems are commonly used to control motor position or velocity. Servo systems are typically defined by their system transfer function. The transfer function is the relationship of motor input to motor output. Internal operating parameters of the motor are elements of the system transfer function as are the transfer functions of feedback circuits, filters, tachometers and other components of the servo system.

Engineering analysis of motor control systems are normally made in the complex frequency domain. Laplace transforms are substituted for the input and output functions, as well as the internal operating parameters of the motor. These elements are then described as a function of a complex frequency s.

The command input to a velocity servo controller may be defined as a velocity command signal VCS(s). The controlled output of the system is the motor velocity w(s). The transfer function of the controller is defined as a ratio of the motor input to motor output, VCS(s)/w(s). Motor parameters of particular interest in the analysis include inductance L, resistance R, inertial load J, and a torque constant $K_T$. $K_B$ represents the back EMF constant which is a physical parameter of the motor. Taken together, these parameters represent, in electrical terms, the operating characteristics of the motor.

The velocity servo controller utilizes feedback signals obtained from the motor. The first of these is a velocity feedback signal, $K_v w(s)$, produced by a tachometer connected to the output shaft of the motor. The constant $K_v$ represents a gain of the tachometer and is typically expressed in units of volts per RPM. A current feedback signal $K_i i(s)$ is also utilized. This signal may be taken directly from the motor or the drive amplifier. $K_i$ represents a gain of a transducer and is expressed in units of volts output per amp of drive current.

Two degree of freedom configurations for velocity servo control systems are well known. One of many such configurations in shown in FIG. 1. The velocity command signal VCS(s) and velocity feedback signal $K_v w(s)$ are summed at a first summing junction to produce an error signal. The error signal is processed by a first compensation circuit having a transfer function $G_v(s)$. The velocity feedback signal $K_v w(s)$ is processed by a second compensation circuit having a transfer function $G_f(s)$. The signals processed by the first and second compensation circuits are applied to a second summing junction, along with the current feedback signal $K_i i(s)$. The output of the second summing junction is applied to an amplifier having a gain $K_a$. The output of the amplifier is the motor control voltage $V_m$, which is applied to the motor itself.

By varying the transfer functions $G_v(s)$ or $G_f(s)$, it is possible to vary the bandwidth of the servo controller. The bandwidth is the range of frequencies over which the servo controller can respond. Changes in the transfer functions $G_f(s)$ or $G_v(s)$ also cause variations in a damping factor of the servo controller. The damping factor is a parameter indicative of the time it takes for the servo controller to settle to its steady state value after a change of the velocity command signal VCS(s) has been received. Although in actual operating environments it may often be desirable to vary both bandwidth and damping factor, prior art systems which vary both bandwidth and damping during tuning are difficult to work with. Additional variations may be introduced in response to other factors, such as load changes.

Both the bandwidth and damping factor are derived from the closed-loop transfer function of the servo controller and motor. These parameters contain common elements, however, and are therefore interrelated. Because conventional adjustments to either bandwidth or damping factor by readjusting $G_v$ or $G_f$ affect the other, no technique for decoupling these two parameters was known in the prior art. The tuning of bandwidth and damping factor is, therefore, an involved iterative process requiring extensive empirical manipulation.

SUMMARY OF THE INVENTION

The present invention is an improved two-degree of freedom velocity servo control system. A unique adjustment circuit allows independent adjustment of bandwidth and damping factor.

The present invention includes first and second compensation means. The first compensation means is connected to receive an error signal representing a difference between the velocity command signal and a first velocity feedback signal. An output of the first compensation means is related to the error signal by a first transfer function. The second compensation means is connected to receive the first velocity feedback signal and provide an output signal related to the feedback signal by a second transfer function.

Bandwidth adjustment means are coupled to both the first and second compensation means for simultaneously adjusting the first and second transfer functions. Damping adjustment means are coupled to the second compensation means for adjusting the second transfer function. Both bandwidth and damping factor adjustments may be made independently of one another.

In the preferred embodiment, the first transfer function has characteristics of an integrator characterized by a gain constant. The second transfer function is a sum of two components, the first component having characteristics of a differentiator characterized by a gain constant and a second component having characteristics of a gain constant. The bandwidth adjustment means varies the gain of the first transfer function and the gain of the first component of the second transfer function. These gains are varied to maintain a predetermined relationship between them. Damping factor adjustment means varies the gain of the second component of the second transfer function. In the preferred embodiment, the gain of the first component of the second transfer function is maintained equal to a reciprocal of the gain of the first transfer function.

In further embodiments of the present invention, the bandwidth and damping factor adjustment means are electronically adjustable in response to remotely generated bandwidth and damping factor control signals. The control signals each comprise a nibble of a digital byte.

BRIEF DESCRIPTION OF THE FIGURES

FIG. 4 is a list of equations referenced in the Detailed Description of the Preferred Embodiments.

DETAILED DESCRIPTION OF THE PREFERRED EMBODIMENTS

Theory of the Invention

Figure 1:
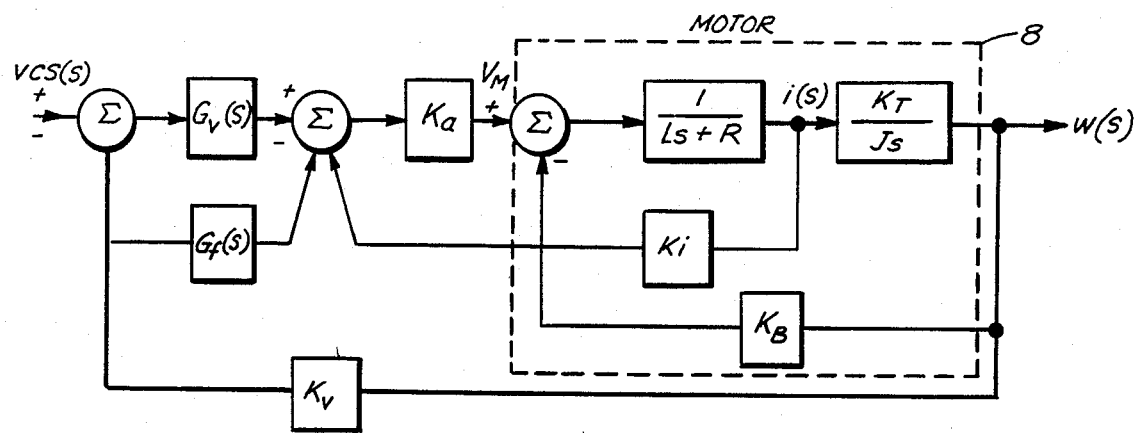
FIG. 1 is a block diagram of a two-degree of freedom servo control system and motor known in the prior art.

FIG. 1 illustrates, in block diagram form, a two-degree of freedom velocity servo control system and its interconnection to a motor 8. Physical parameters, as well as electrical characteristics of the motor, are given in terms of electric equivalents. These parameters are described in the Description of the Prior Art.

Figure 2:
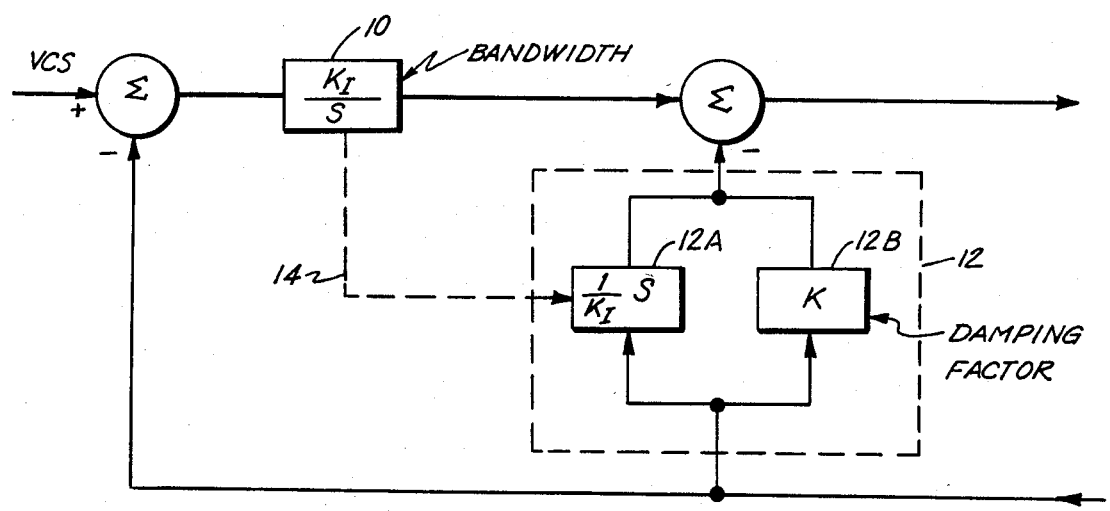
FIG. 2 is a block diagram of the present invention showing an improvement to the prior art servo control system.

FIG. 2 is a block diagram representation of the present invention and its interrelationship to the control system shown in FIG. 1. A transfer function $G_v(s)$ of first compensation circuit 10 is defined by Equation 1. Transfer function $G_v(s)$ represents an integrator which is characterized by a gain constant $K_I$.

Transfer function $G_f(s)$ of second compensation circuit 12 is defined by Equation 2. Transfer function $G_f(s)$ is the sum of a gain constant K and a differentiator characterized by a gain constant Kt.

An interrelationship between gains of first compensation circuit 10 and second compensation circuit 12 is provided by Equation 3. When Equation 3 is substituted into Equation 2, and Equations 1 and 2 are used to represent the first and second transfer functions of first and second compensation circuits 10 and 12, a closed-loop transfer function for the complete control system and motor shown in FIG. 1 may be written. This transfer function is as defined by Equation 4.

When amplifier gain $K_a$ is of large magnitude, the closed-loop transfer function of Equation 4 can be reduced to a second order equation. Equation 5 describes this result. The natural frequency $w_n$ and damping factor d are both elements of Equation 5 and readily determined. Equation 6 describes the natural frequency $w_n$. Equations 7 and 8 describe damping factor d.

Several assumptions are typically made at this point. Servo controllers do not always have a current feedback loop; in which case, the current feedback constant $K_i = 0$. Even if this is not the case, the inertial load J is usually very small. Under these circumstances, the assumptions described by Equations 9 and 10 are made.

When Equations 9 and 10 hold, the natural frequency $w_n$ is nearly equal to gain constant $K_I$. This relationship is shown by Equation 11. Damping factor d is found by substituting Equations 9, 10 and 11 into Equation 8. Damping factor d is found to be nearly equal to gain constant K/2 and is described by Equation 12.

Equation 11 shows that the control system's natural frequency $w_n$ is directly proportional to gain constant $K_I$. Natural frequency $w_n$ is, in turn, directly proportional to the control system's bandwidth. A change in gain constant $K_I$ will, therefore, linearly affect the control system's natural frequency and bandwidth. Equation 12 shows that the damping factor d is directly proportional to the gain constant K. By changing the gain constant K, it is therefore possible to vary the damping factor of the system.

The essence of the present invention will be appreciated when Equation 3 is substituted into the second transfer function $G_f(s)$. Equation 13 describes the result.

A first component of Equation 13 is a differentiator characterized by a gain constant $1/K_I$. A second component is a gain constant K. Damping factor adjustments are made by varying gain constant K. This adjustment does not affect bandwidth. Bandwidth adjustments are made by varying the gain constant $K_I$. As long as the gain constant of the first component of Equation 13 is maintained equal to $1/K_I$, there will be no affect on damping factor. This interrelationship is illustrated by dashed line 14 in FIG. 2.

Electronic Circuit of the Preferred Embodiment

Figure 3:
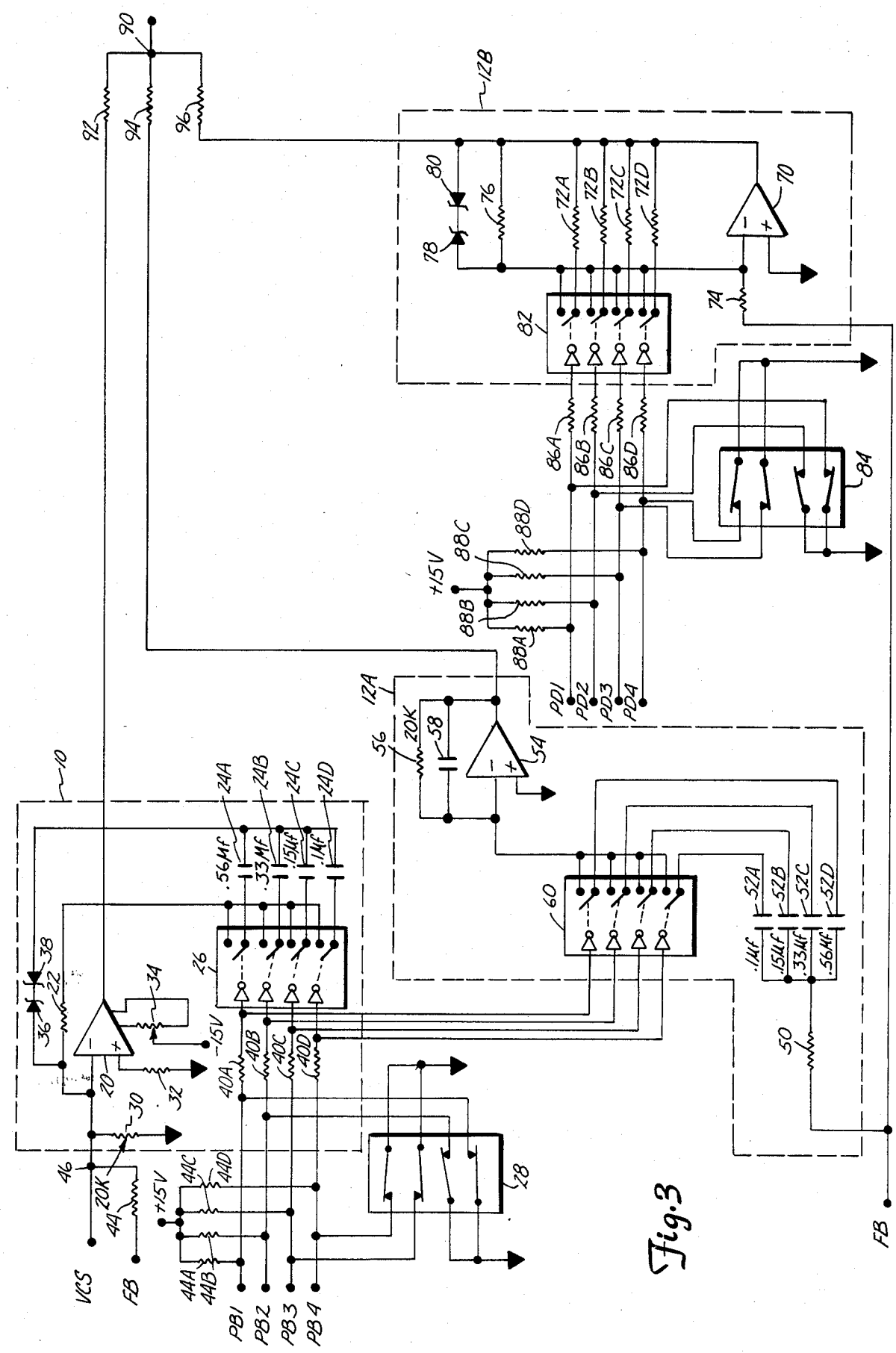
FIG. 3 is a schematic representation of a circuit for realizing the present invention.

A preferred embodiment of the servo controller of the present invention is shown in FIG. 3. A first compensation circuit 10 implements the $G_v(s)$ transfer function of an integral characterized by a gain constant $K_I$. First compensation circuit 10 includes operational amplifier 20 connected in an inverting configuration with resistor 22 and selected capacitors 24A–24D connected in its feedback loop. Electronically controlled switch 26 is used to interconnect one or more of capacitors 24A–24D into the feedback circuit. Electronically controlled switch 26 may, in turn, be controlled by a user operated switch 28. Resistor 32, potentiometer 34 and diodes 36 and 38 are part of the normal bias circuitry of first compensation circuit 10. Resistors 40A–40D are current limiting resistors, and resistors 44A–44D are biasing resistors for switch 26. Resistor 30, along with capacitors 24A–24B, determine the gain constant of the integrator if the output impedance of the velocity command signal and feedback signal sources is high.

The velocity command signal VCS and the velocity feedback signal FB, after it passes through resistor 44, are summed at node 46 at the input of amplifier 20. The signal input to amplifier 20 is integrated by the integrator circuit of block 10 which has a gain constant $K_I$. Switch 28 has sixteen positions, each one of which selects one of the sixteen possible permutations of capacitors 24A–24D which may be sequentially switched into the feedback loop of first compensation circuit 10. There are, therefore, sixteen possible values of gain constant $K_I$ which may be selected with this particular circuit configuration.

Second compensation circuit 12 is a realization of the $G_f(s)$ transfer function and includes components 12A and 12B. The first component 12A of second compensation circuit 12 is a differentiator having an adjustable gain constant. First component 12A of second compensation circuit 12 includes resistor 50 and a parallel array of capacitors 52A–52D which is connected in series through contacts of switch 60 to an inverting input terminal of operational amplifier 54. Resistor 56 and capacitor 58 are connected in parallel and form the feedback loop of the differentiator. Electronically-controlled switch 60 selects the one or more of capacitors 52A–52D which is to be interconnected in parallel to the input terminal of operational amplifier 54. Resistor 56, along with capacitors 52A–52D, determine the gain constant of the differentiator.

The input to second compensation circuit 12 is the velocity feedback signal FB. That feedback signal is differentiated by a first component 12A having gain constant $1/K_I$. There are sixteen possible permutations by which capacitors 52A–52D may be switched into the differentiator circuit of block 12A by electronically-controlled switch 60. Each is selected by one of the sixteen positions of user operated switch 28 and represents a different value of gain constant $1/K_I$.

Second component 12B of second compensation circuit 12 receives the velocity feedback signal as an input and amplifies it by a factor determined by a gain constant K. Second component 12B includes operational amplifier 70 connected in an inverting and amplifying configuration with a parallel switched array of resistors 72A-72D in the feedback loop and input resistor 74 connected to the input. Resistor 76 and diodes 78 and 80 are part of the normal amplifier bias arrangement for second component 12B of second compensation circuit 12. Electronically controlled switch 82 selects which of resistors 72A-72D will be connected in the feedback loop. Electronically controlled switch 82 may, in turn, be controlled by user operated switch 84. Resistors 86A-86D are current limiting resistors, and resistors 88A-88D are bias resistors for switch 82.

The gain constant K of second component 12B is varied by an operator by selecting one of the sixteen positions of user operated switch 84. Switch 84 controls electronically controlled switch 82 which, in turn, selects one of the sixteen sequential permutations by which resistors 72A-72D are interconnected into the feedback loop of second component 12A of second compensation circuit 12. This particular circuit configuration, therefore, allows for sixteen different gain constants K which are controlled in a sequential manner.

As shown in FIG. 3, outputs of first compensation circuit 10 and first and second components of second compensation circuit 12 are summed at node 90 through resistors 92, 94 and 96, respectively. FIG. 3 shows the realization of only those portions of the electronic circuitry which embody my invention. The remainder of the circuitry used to mechanize a circuit, as shown in the block diagram of FIG. 1, is well known.

As shown in the discussion of the Theory of the Invention, the gain constant of first component 12A of second compensation circuit 12 must be varied when the gain constant of first compensation circuit 10 is varied to adjust bandwidth. Specifically, the gain constant of first component 12A of second compensation circuit 12 must be maintained equal to the reciprocal of the gain constant $K_I$ of first compensation circuit 10. When this relationship is maintained, the damping factor will remain constant when bandwidth is adjusted. Dashed line 14 in FIG. 2 symbolically illustrates this relationship.

The gain constants of first and second compensation circuits 10 and 12 are determined as a function of RC time constants. The integrator of first compensation circuit 10 has a gain constant $K_I$ equal to the reciprocal of the circuit RC time constant. This is described by Equation 14. $R_{30}$ refers to the resistance of resistor 30, while $C_E$ refers to the equivalent capacitance of the capacitors selected from 24A-24D. The gain constant of the differentiator of second compensation circuit 12 is directly equal to the product of the resistance of resistor 56 and the effective capacitance of the capacitors selected from 52A-52D.

To maintain the required gain relationship, the capacitance of each capacitor 52A-52D of first component 12A is equal to the capacitance of each capacitor 24A-24D, respectively, of first compensation circuit 10. Likewise, the resistance of resistor 56 is equal to the resistance of resistor 30. Each of the permutations of capacitors 24A-24D corresponds to a specific permutation of capacitors 52A-52D. For this reason, user-operable switch 28 causes electronically-operated switches 26 and 60 to select identical capacitors for first compensation circuit 10 and first component 12A of second compensation circuit 12. In this way, the gain constant of first component 12A of second compensation circuit 12 is always maintained equal to the reciprocal of the gain constant $K_I$ of first compensation circuit 10. Bandwidth of the servo control system of the present invention is therefore varied by selecting one of the 16 positions on user operable switch 28. The damping factor is similarly varied by selecting one of the 16 positions on user operated switch 84. System bandwidth and damping factor are thereby independently controlled.

An advantage of the present invention is the ease with which it may be interconnected to a microcomputer based motor control system. Input ports PB1-PB4 may be connected to receive digital signals representative of selected system bandwidth parameters. Input ports PD1-PD4 may be connected to receive digital signals representative of system damping. In a preferred embodiment, information concerning bandwidth and damping factor may be processed in first and second four-bit nibbles within a single byte of the microcomputer. The two four-bit nibbles are easily interfaced to ports PB1-PB4 and PD1-PD4.

In conclusion, the present invention provides a control system which is particularly advantageous when utilized as a velocity servo controller for a DC motor. The controller provides easy and independent tuning of system bandwidth and/or damping. The system has zero steady state error and provides a high degree of noise immunity. The system exhibits a high degree of "robustness," being very insensitive to torque and other load variations.

Although the present invention has been described with reference to preferred embodiments, workers skilled in the art will recognize that changes may be made in form and detail without departing from the spirit and scope of the invention. In addition, although the specific embodiment shown in FIG. 3 varies the gain constants by selecting from a plurality of capacitors, other realizations of the $G_v(s)$ and $G_f(s)$ transfer functions which lend themselves to the coordinated adjustment in accordance with the present invention are also possible.

What is claimed is:

1. In a two-degree of freedom velocity servo controller for a motor, a compensation network comprising, in combination:

first compensation means connected for receiving an error signal representing a difference between a velocity feedback signal and a velocity command signal and for providing a modified output signal to a summing point;

second compensation means connected for receiving the velocity feedback signal and for providing a modified output signal to the summing point;

bandwidth adjustment means operatively coupled to the first and second compensation means for adjusting the bandwidth of the servo controller without varying a damping factor of the controller; and damping adjustment means operatively coupled to the second compensation means for adjusting the damping factor of the servo controller without varying the bandwidth of the controller.

2. The invention of claim 1 wherein:

the first compensation means provides a modified output signal which is proportional to an integral of the error signal;

the second compensation means provides an output signal which is the sum of a signal proportional to a derivative of the velocity feedback signal and a signal proportional to the input signal;

the bandwidth adjustment means varies a gain of the first compensation means, and wherein the bandwidth adjustment means varies the gain of the first compensation means and a gain of the portion of the second compensation means proportional to the derivative of the velocity feedback signal in a predetermined relationship; and the damping factor adjustment means varies a gain of the portion of the second compensation means producing the output signal proportional to the input signal.

3. The invention of claim 2 wherein the predetermined relationship between the gain of the first compensation means and the derivative portion of the second compensation means is an inverse relationship which remains constant as the bandwidth adjustment means is varied.

4. The invention of claim 1 wherein the bandwidth and damping and adjustment means are electronically adjustable in response to an input command signal.

5. The invention of claim 4 wherein the input command signal is a digital signal of a single byte and wherein the bandwidth and damping and adjustment means are constructed and arranged for receiving the input signal and adjusting the bandwidth and damping factor of the servo controller in accordance with either a most or least significant nibble in the input signal.

6. In a velocity servo controller for a DC motor in which a velocity command signal is indicative of a desired motor velocity and velocity feedback signals are indicative of actual motor velocity, wherein the velocity command signal is summed at a first summing junction with a first velocity feedback signal to produce an error signal, wherein the error signal is compensated and summed with a compensated first velocity feedback signal and a current feedback signal at a second summing junction, and wherein an output of the second summing junction is compensated to produce a motor control voltage which is summed at a third summing junction with a second velocity feedback signal:

first adjustable compensation circuit means for receiving the error signal and for providing the compensated error signal related to the error signal by a specific transfer function which is adjustable;

second adjustable compensation circuit means for receiving the first velocity feedback signal and for providing the compensated first velocity feedback signal, the compensated first velocity feedback signal related to the first velocity feedback signal by a specific transfer function being the sum of first and second adjustable components;

bandwidth altering means operatively coupled to the first compensation circuit means and the second compensation circuit means for adjusting the transfer function of the first compensation circuit means and for adjusting the first component of the transfer function of the second compensation circuit means, the transfer functions being adjusted to maintain a predetermined relationship so as to tune the bandwidth of the servo controller independent of its damping factor; and damping factor altering means operatively coupled to the second compensation circuit means for adjusting the second component of the transfer function so as to tune the damping factor of the servo controller independent of the bandwidth.

7. The servo controller of claim 6 wherein:

the transfer function of the first compensation circuit means has characteristics of an integrator; and the first component of the transfer function of the second compensation circuit means has characteristics of a differentiator and the second component has characteristics of a constant gain.

8. The servo controller of claim 7 wherein:

the bandwidth altering means varies a gain of the integrator of the first compensation circuit means and a gain of the differentiator of the second compensation circuit means; and the damping factor altering means varies the gain of the constant of the second compensation circuit means.

9. The servo controller of claim 8 wherein the bandwidth altering means is constructed and arranged to select the gain of the differentiator of the second compensation circuit means to maintain the gain equal to a reciprocal of the gain of the integrator of the first compensation circuit means.

10. The servo controller of claim 9 wherein:

the bandwidth altering means varies the gain of the integrator by selecting one or more of a plurality of capacitors connected within the first compensation circuit means, and varies the gain of the differentiator by selecting one or more of a plurality of capacitors connected within the second compensation circuit means and wherein the capacitors in the second compensation circuit means are selected as a function of the capacitors selected in the first compensation circuit means.

11. The servo controller of claim 7 and including means for electronically manipulating the bandwidth and damping adjustment means in response to bandwidth and damping control signals.

12. The servo controller of claim 8 wherein the bandwidth and damping control signals each comprise a single nibble of a single digital byte.

13. In a two-degree of freedom velocity servo controller for a motor, a compensation network comprising, in combination:

integration circuit means connected to receive an error signal representing a difference between a velocity command signal and a velocity feedback signal and to provide an integral of the error signal, the integral being proportional to a reciprocal of a first RC time constant;

differentiation circuit means connected to receive the velocity feedback signal and to provide a derivative of the velocity feedback signal, the derivative being proportional to a second RC time constant;

amplification circuit means connected to receive the velocity feedback signal and to provide an amplified velocity feedback signal;

bandwidth adjustment means coupled to the integration circuit means and the differentiation circuit means, the bandwidth adjustment means varying the first and second RC time constants so to maintain them equal to each other, the bandwidth thereby being varied independently of damping factor; and damping factor adjustment means coupled to the amplification circuit means for varying a gain of the amplified velocity feedback signal, the damping factor thereby being varied independently of bandwidth.

* * * * *